United States Patent [19]

Matsushita et al.

[11] Patent Number: 4,847,871
[45] Date of Patent: Jul. 11, 1989

[54] VITERBI DETECTOR FOR DIGITAL SIGNAL

[75] Inventors: Koji Matsushita; Akira Iketani, both of Osaka, Japan

[73] Assignee: Matsushita Electric Industrial Co., Ltd., Japan

[21] Appl. No.: 148,363

[22] Filed: Jan. 25, 1988

[30] Foreign Application Priority Data

Jan. 28, 1987 [JP] Japan .................................. 62-17692
Feb. 27, 1987 [JP] Japan .................................. 62-45520
Jun. 4, 1987 [JP] Japan ................................. 62-140288

[51] Int. Cl.$^4$ ........................................... H04L 1/00
[52] U.S. Cl. ...................................... 375/94; 371/43; 375/101
[58] Field of Search ..................... 375/18, 94, 96, 101; 371/43, 44, 45

[56] References Cited

U.S. PATENT DOCUMENTS 4,536,878 8/1985 Rattlingourd et al. ............... 371/43
4,710,746 12/1987 Shimada et al. ...................... 371/43

Primary Examiner—Benedict V. Safourek
Attorney, Agent, or Firm—Lowe, Price, LeBlanc, Becker & Shur

[57] ABSTRACT

A plurality of assumed detection value series correspond to combinations of a plurality of Viterbi detection series and a plurality of assumed detection values. The Viterbi detection series correspond to possible survived paths. The assumed detection values correspond to a current input value. A data series corresponds to intersymbol interference. Assumed input amplitude values are determined in accordance with the assumed detection value series and the data series. Differences between the assumed input amplitude values and the current input value are calculated. Likelihoods corresponding to degrees of sureness of survived path branches are calculated on the basis of the calculated differences. One of the possible survived paths is selected in accordance with the calculated likelihoods. A detection value is generated in accordance with the selected survived path.

5 Claims, 5 Drawing Sheets ( i = 0 OR 1 )

4,847,871

VITERBI DETECTOR FOR DIGITAL SIGNAL

BACKGROUND OF THE INVENTION

This invention relates to a Viterbi detector for a digital signal having intersymbol interference.

Viterbi detectors are used to discriminate digital signals. Conventional Viterbi detectors have various problems as will be described hereinafter.

SUMMARY OF THE INVENTION

It is an object of this invention to provide an excellent Viterbi detector for a digital signal.

In a Viterbi detector of this invention, a plurality of assumed detection value series correspond to combinations of a plurality of Viterbi detection series and a plurality of assumed detection values. The Viterbi detection series correspond to possible survived paths. The assumed detection values correspond to a current input value. A data series corresponds to intersymbol interference. Assumed input amplitude values are determined in accordance with the assumed detection value series and the data series. Differences between the assumed input amplitude values and the current input value are calculated. Likelihoods corresponding to degrees of sureness of survived path branches are calculated on the basis of the calculated differences. One of the possible survived paths is selected in accordance with the calculated likelihoods. A detected value is generated in accordance with the selected survived path.

DESCRIPTION OF THE PREFERRED EMBODIMENTS

Prior to the detailed description of this invention, conventional systems and detectors will be described for a better understanding of this invention.

Conventional magnetic recording and reproducing systems generally use equalizers to open eye patterns and to discrimate digital values. In typical high-density magnetic recording and reproducing systems such as digital video tape recorders, intersymbol interference is great so that an equalizer compensating this intersymbol interference generally needs emphasis of high frequency signal components. Such emphasis of high frequency signal components decreases the signal-to-noise ratio and increases errors of digital codes.

Figure 1:
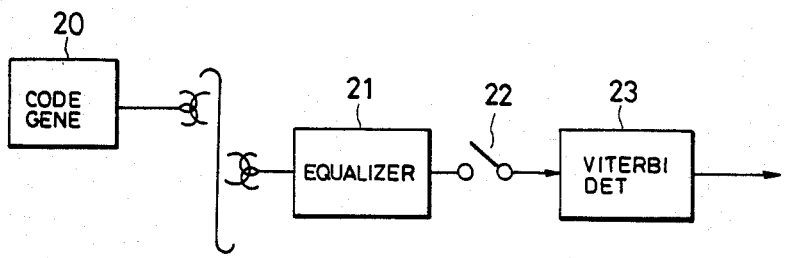
FIG. 1 is a block diagram of a conventional magnetic recording and reproducing system.
Figure 2:
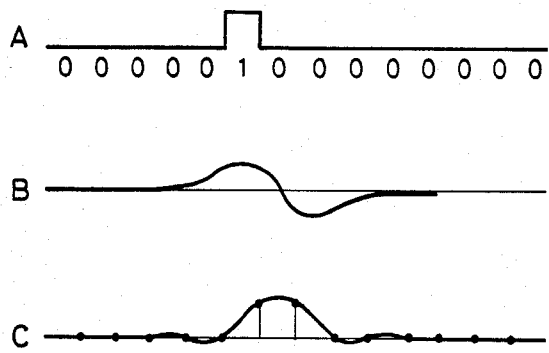
FIG. 2 shows examples of waveforms of signals in the system of FIG. 1.

FIG. 1 shows a conventional advanced magnetic recording and reproducing system of the equalizing type such as the partial response type positively utilizing intersymbol interference. The magnetic recording and reproducing system of FIG. 1 includes a code generator 20, an equalizer 21, and a Viterbi detector 23. The code generator 20 outputs an impulse signal which is recorded in a magnetic recording medium such as a magnetic tape. A signal reproduced from the magnetic recording medium is wave-shaped by the equalizer 21. An output signal from the equalizer 21 is sampled by a switching circuit 22. Samples of the output signal from the equalizer 21 are sequentially inputted into the Viterbi detector 23. For example, in the case where the impulse signal assumes "1" in one unit interval as shown by the line A of FIG. 2, the corresponding reproduced signal takes the waveform shown by the line B of FIG. 2 and the corresponding output signal from the equalizer 21 takes the waveform shown by the line C of FIG. 2. As shown by the dots on the line C of FIG. 2, the corresponding output signal from the sampling circuit 22 assumes "1" in consecutive two unit intervals. In this way, the response to an impulse having a level "1" in one unit interval equals a signal having a level "1" in consecutive two unit intervals. Accordingly, the magnetic recording and reproducing system of FIG. 1 is generally referred to as a duobinary partial response system. As understood from the previous description, the values of consecutive two bits in the output signal of the sampling circuit 22 have correlation. The Viterbi detector 23 uses the correlation in preventing wrong detection which would be caused by noises.

Figure 3:
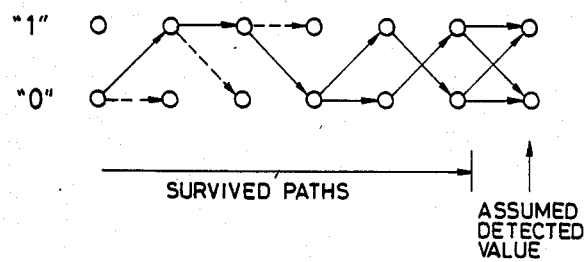
FIG. 3 is a trellis picture of a detection process in the Viterbi detector of FIG. 1.

FIG. 3 is a trellis picture of a detection process in the conventional Viterbi detector 23 in respect of detected values (0, 1). The circles in FIG. 3 denote possible detected values corresponding to respective sampled values. Specifically, the circles at the right-hand end denote assumed detected values corresponding to newest input values. In adjacent circles, the leftward circles denote detected values corresponding to input values which immediately precede input values related to detected values denoted by the rightward circles. As shown in FIG. 3, there are two survived paths, that is, a path 0 and a path 1, which can be discriminated in accordance with whether a final value equals "0" or "1". The broken lines in FIG. 3 denote cut paths or unsurvived paths. The survived paths mean series of detected values having highest likelihoods. There are four different combinations of the survived paths and the assumed detected values. The likelihoods of these combinations are compared.

Figure 4:
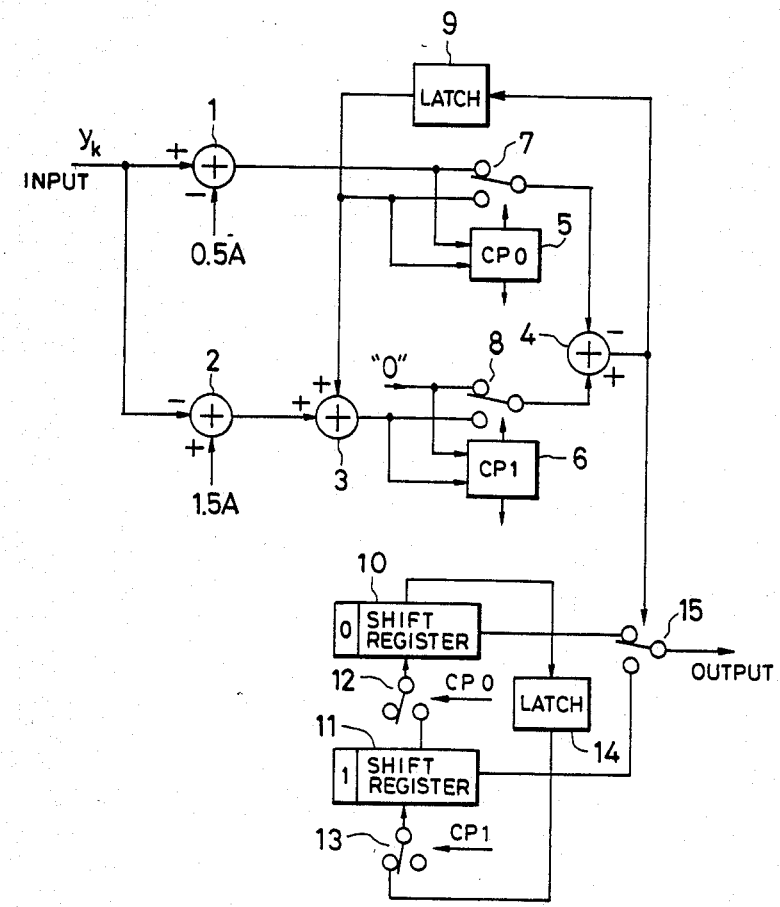
FIG. 4 is a block diagram of the Viterbi detector of FIG. 1.

FIG. 4 shows an internal structure of the conventional Viterbi detector 23. The character $y_k$ denotes a k-the sampled input value. The character "j" represents an assumed detected value corresponding to the sampled input value $y_k$. The character "i" equal to "0" represents a survived path 0. The character "i" equal to "1" represents a survived path 1. Input amplitude values $a_{ij}$ are assumed for the respective combinations of the values "i" and "j". The input amplitude values $a_{ij}$ are equal to amplitude values of a signal waveform obtained by superposing a plurality of impulse response waveforms. The input amplitude values $a_{ij}$ assume one of 0, A, and 2A where the character A denotes an amplitude value of an impulse response.

| i | j | $a_{ij}$ | $l_k(i,j)$ |
|---|---|---|---|
| 0 | 0 | 0 | $y_k^2$ |
| 1 | 0 | A | $(y_k - A)^2$ |
| 0 | 1 | A | $(y_k - A)^2$ |
| 1 | 1 | 2A | $(y_k - 2A)^2$ |

Table 1 shows the assumed amplitude values $a_{ij}$ and the likelihoods $l_k(i,j)$ of the path branches for the respective series of the combinations of the values "i" and "j". The likelihoods $l_k(i,j)$ are given by the following equation.

$$l_k(i,j) = (y_k - a_{ij})^2 \tag{1}$$

As understood from the equation (1), the likelihoods $l_k(i,j)$ are equal to errors of estimation which correspond to deviations between the actual input amplitude values $y_k$ and the assumed amplitude values $a_{ij}$. A metric corresponding to the path 0 is represented by the character $m_k(0)$. A metric corresponding to the path 1 is represented by the character $m_k(1)$. It should be noted that the metrics $m_k(0)$ and $m_k(1)$ are indexes representing the likelihoods of the paths. The metrics $m_k(0)$ and $m_k(1)$ are given by the following equations.

$$m_k(0) = \min[m_{k-1}(0) + l_k(0,0), m_{k-1}(1) + l_k(1,0)] \tag{2}$$

$$m_k(1) = \min[m_{k-1}(0) + l_k(0,1), m_{k-1}(1) + l_k(1,1)]$$

where the character min[X, Y] denotes an operator selecting the smaller of the values X and Y and thus selecting the surer path. The difference $\Delta_k$ is now given as:

$$\Delta_k = m_k(1) - m_k(0) \tag{3}$$

The combination of the equations (2) and (3) produces the following equation.

$$\Delta_k = \min[0, \Delta_{k-1} - y_k + 1.5A] - \min[y_k - 0.5A, \Delta_{k-1}] \tag{4}$$

The upper half of the conventional Viterbi detector 23 of FIG. 4 calculates the difference $\Delta_k$ by referring to the equation (4).

In the conventional Viterbi detector 23 of FIG. 4, the input value $y_k$ is applied to first input terminals of subtracters 1 and 2. A second input terminal of the subtracter 1 is subjected to a value equal to 0.5A. An output of the subtracter 1 corresponds to a value equal to $y_k - 0.5A$. An output of a latch 9 corresponds to a value equal to $\Delta_{k-1}$. A combination of a comparator 5 and a switch 7 selects the smaller of the outputs from the subtracter 1 and the latch 9, that is, the values equal to $y_k - 0.5A$ and $\Delta_{k-1}$ respectively. A second input terminal of the subtracter 2 is subjected to a value equal to 1.5A. An output of the subtracter 2 and the output of the latch 9 are inputted to an adder 3. An output of the adder 3 corresponds to a value equal to $\Delta_{k-1} - y_k + 1.5A$. A combination of a comparator 6 and a switch 8 selects the smaller of the output from the adder 3 and a value equal to "0", that is, the values equal to $\Delta_{k-1} - y_k + 1.5A$ and "0" respectively. Outputs from the switches 7 and 8 are inputted into a subtracter 4. An output from the subtracter 4 corresponds to the difference $\Delta_k$. The output from the subtracter 4 is applied to the latch 9 and also to a control terminal of a switch 15.

In the conventional Viterbi detector 23 of FIG. 4, shift registers 10 and 11 hold bit sequences corresponding to the survived path 0 and the survived path 1 respectively. The registers 10 and 11 are connected via a switch 12 having a control terminal connected to the comparator 5. The registers 10 and 11 are also connected via a latch 14 and a switch 13 having a control terminal connected to the comparator 6. When the comparator 5 selects the path 1, the contents of the register 11 are copied and transferred to the register 10 via the switch 12. When the comparator 6 selects the path 0, the contents of the register 10 are copied and transferred to the register 11 via the latch 14 and the switch 13. Each time the input and output values are updated, the contents of the registers 10 and 11 are shifted rightward by unit and the values "0" and "1" are inputted into the left-hand ends of the registers 10 and 11 respectively. The two survived paths normally merge in a detection process if the time is retraced, and the oldest detected values are outputted from the right-hand ends of the registers 10 and 11. If the paths do not merge, the switch 15 selects the surer of the detected value outputs from the registers 10 and 11 in accordance with the output of the subtracter 4. In this way, the Viterbi detection corrects past errors by selecting the surer path.

The discrimination of digital values through an equalization process has limitations. In the case where intersymbol interference is great, emphasis of high frequency signal components in an equalizer decreases the signal-to-noise ratio and increases errors of digital codes. In the case where the conventional magnetic recording and reproducing system of FIG. 1 uses a duobinary partial response system, although weak emphasis of high frequency signal components can produce adequate effects, emphasis of low frequency signal components is necessary which causes noises. Since general magnetic recording systems have characteristics that low frequency signal components are cut off, they require emphasis of low frequency signal components. In addition, it is generally difficult to obtain an accurate equalizer.

This invention will be described in detail hereinafter with reference to FIGS. 5-10.

Figure 5:
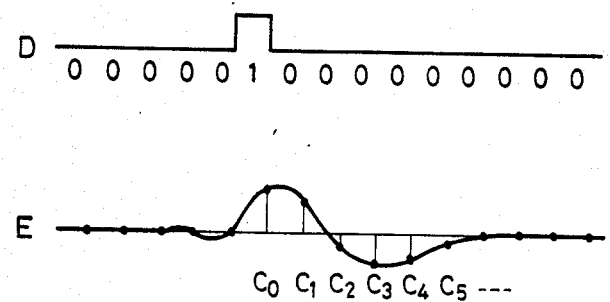
FIG. 5 is a diagram of examples of waveforms of an impulse and a corresponding impulse response in connection with a Viterbi detector of this invention.

In FIG. 5, the line D denotes an impulse having a value "1" in one unit interval and the line E denotes a waveform of a response to the impulse D in connection with a Viterbi detector of this invention. A series of impulse response values $c_m$ (m=1, 2, ..., n) extends for an aribitrary length of time. In addition, the impulse response values $c_m$ (m=1, 2, ..., n) have aribtrary amplitudes. This invention features that an eye-opening equalizer is unnecessary.

Figure 6:
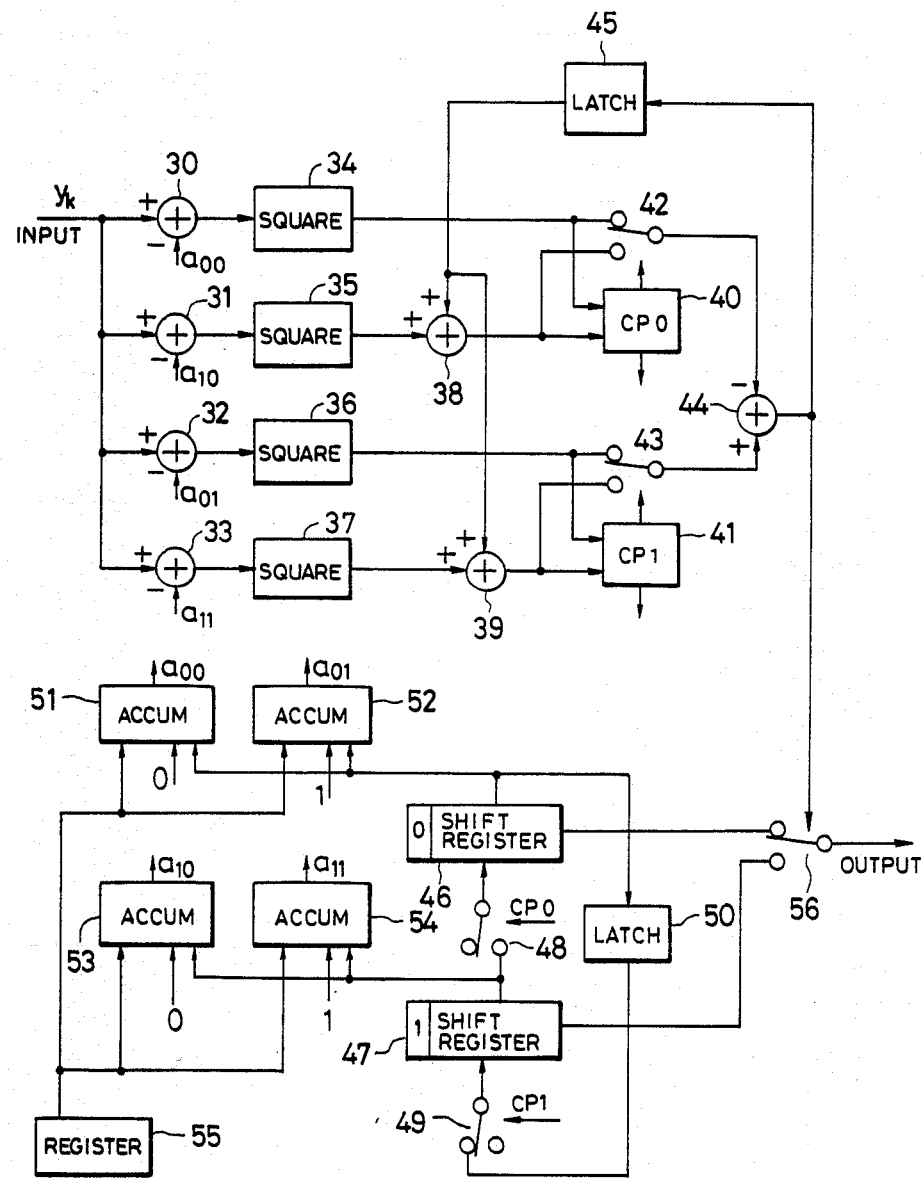
FIG. 6 is a block diagram of a Viterbi detector according to a first embodiment of this invention.

FIG. 6 shows a Viterbi detector according to a first embodiment of this invention. In the Viterbi detector of FIG. 6, there are four different combinations of survived path types "i" (i=0 or 1) and assumed detected values "j" (j=0 or 1). A series or bit sequence of survived paths is represented by the character $b_{im}$ (m=1, 2, ..., n). A series of impulse response values exhibiting intersymbol interference is represented by the character $c_m$ (m=0, 1, ... n). An assumed amplitude value a of a $a_{ij}$ in a series combination of the values "i" and "j" is given by the following equation.

$$a_{ij} = c_0 \cdot j + \sum_{m=1}^{n} c_m b_{im} \tag{5}$$

The likelihood $l_k(i,j)$ of a path branch related to the assumed amplitude value $a_{ij}$ is given by the following equation.

$$l_k(i,j) = (y_k - a_{ij})^2 \quad (6)$$

The assumed amplitude value $a_{ij}$ varies as a function of the impulse response value $c_m$. When metrics $m_k(0)$ and $m_k(1)$ are introduced as in the equation (2), an equation corresponding to the equation (4) is given as:

$$\Delta_k = \min[(y_k - a_{01})^2, \Delta_{k-1} + (y_k - a_{11})^2] - \min[(y_k - a_{00})^2, \Delta_{k-1} + (y_k - a_{10})^2] \quad (7)$$

where the value $\Delta_k$ represents the difference between the metrics $m_k(0)$ and $m_k(1)$.

The Viterbi detector of FIG. 6 includes subtracters 30, 31, 32, and 33 having first input terminals subjected to an input signal representing an input value $y_k$. Second input terminals of the subtracters 30, 31, 32, and 33 are subjected to signals representative of assumed amplitude values $a_{00}$, $a_{10}$, $a_{01}$, and $a_{11}$ outputted from accumulators 51, 52, 53, and 54 respectively. An output signal from the subtracter 30 which represents a value "$y_k - a_{00}$" is applied to a squaring circuit 34. The squaring circuit 34 outputs a signal representing a value "$(y_k - a_{00})^2$". An output signal from the subtracter 31 which represents a value "$y_k - a_{10}$" is applied to a squaring circuit 35. The squaring circuit 35 outputs a signal representing a value "$(y_k - a_{10})^2$". An output signal from the subtracter 32 which represents a value "$y_k - a_{01}$" is applied to a squaring circuit 36. The squaring circuit 36 outputs a signal representing a value "$(y_k - a_{01})^2$". An output signal from the subtracter 33 which represents a value "$y_k - a_{11}$" is applied to a squaring circuit 37. The squaring circuit 37 outputs a signal representing a value "$(y_k - a_{11})$"

A first input terminal of an adder 38 is subjected to the output signal from the squaring circuit 35. A second input terminal of the adder 38 is subjected to an output signal from a latch 45 which representing a value "$\Delta_{k-1}$". The adder 38 outputs a signal representing a value "$\Delta_{k-1} + (y_k - a_{10})^2$". A first input terminal of an adder 39 is subjected to the output signal from the squaring circuit 37. A second input terminal of the adder 39 is subjected to the output signal from the latch 45. The adder 39 outputs a signal representing a value "$\Delta_{k-1} + (y_k - a_{11})^2$".

The output signal from the squaring circuit 34 is applied to a comparator 40 and a switch 42. The output signal from the adder 38 is applied to the comparator 40 and the switch 42. The device 40 compares the value "$(y_k - a_{00})^2$" and the value "$\Delta_{k-1} + (y_k - a_{10})^2$" represented by the output signals from the devices 34 and 38 respectively. The comparator 40 is connected to the switch 42 so that an output signal from the comparator 40 is applied to a control terminal of the switch 42. The combination of the comparator 40 and the switch 42 selects one of the output signals from the devices 34 and 38 which corresponds to the smaller of the value "$(y_k - a_{00})^2$" and the value "$\Delta_{k-1} + (y_k - a_{10})^2$".

The output signal from the squaring circuit 36 is applied to a comparator 41 and a switch 43. The output signal from the adder 39 is applied to the comparator 41 and the switch 43. The device 41 compares the value "$(y_k - a_{01})^2$" and the value "$\Delta_{k-1} + (y_k - a_{11})^2$" represented by the output signals from the devices 36 and 39 respectively. The comparator 41 is connected to the switch 43 so that an output signal from the comparator 41 is applied to a control terminal of the switch 43. The combination of the comparator 41 and the switch 43 selects one of the output signals from the devices 36 and 39 which corresponds to the smaller of the value "$(y_k - a_{01})^2$" and the value "$\Delta_{k-1} + (y_k - a_{11})^2$".

The signal selected by the combination of the comparator 40 and the switch 42 is applied to a subtracter 44. The signal selected by the combination of the comparator 41 and the switch 43 is applied to the subtracter 44. The subtracter 44 outputs a signal representing a value "$\Delta_k$". The output signal from the subtracter 44 is applied to the latch 45 and a control terminal of a switch 56.

The accumulator 51 receives an output signal from a shift register 46 which represents survived path values $b_{0m}$. The accumulator 51 receives a signal representing a value "j" equal to "0". In addition, the accumulator 51 receives an output signal from a register 55 which represents a series of data values $c_m$ exhibiting intersymbol interference. The accumulator 51 calculates the assumed amplitude value $a_{00}$ in accordance with the equation (5) and outputs the signal representing the assumed amplitude value $a_{00}$.

The accumulator 52 receives the output signal from the shift register 46. The accumulator 52 receives a signal representing a value "j" equal to "1". In addition, the accumulator 52 receives the output signal from the register 55. The accumulator 52 calculates the assumed amplitude value $a_{01}$ in accordance with the equation (5) and outputs the signal representing the assumed amplitude value $a_{01}$.

The accumulator 53 receives an output signal from a shift register 47 which represents survived path values $b_{1m}$. The accumulator 53 receives a signal representing a value "j" equal to "0". In addition, the accumulator 53 receives the output signal from the register 55. The accumulator 53 calculates the assumed amplitude value $a_{10}$ in accordance with the equation (5) and outputs the signal representing the assumed amplitude value $a_{10}$.

The accumulator 54 receives the output signal from the shift register 47. The accumulator 54 receives a signal representing a value "j" equal to "1". In addition, the accumulator 54 receives the output signal from the register 55. The accumulator 54 calculates the assumed amplitude value $a_{11}$ in accordance with the equation (5) and outputs the signal representing the assumed amplitude value $a_{11}$.

The shift registers 46 and 47 hold signals representing bit sequences of the survived path 0 and the survived path 1 respectively. The shift registers 46 and 47 are connected via a switch 48 having a control terminal subjected to the output signal from the comparator 40. In addition, the shift registers 46 and 47 are connected via a latch 50 and via a switch 49 having a control terminal subjected to the output signal from the comparator 41. When the comparator 40 selects the signal corresponding to the path 1, the contents of the shift register 47 are copied and transferred to the shift register 46 via the switch 48. When the comparator 41 selects the signal corresponding to the path 0, the contents of the shift register 46 are copied and transferred to the shift register 47 via the latch 50 and the switch 49. Each time the input and output values are updated, that is, each time the unit sampling interval elapses, the contents of the registers 46 and 47 are shifted rightward by unit and signals representative of values "0" and "1" are inputted into the left-hand ends of the registers 46 and 47 respectively. The two survived paths normally merge in a detection process if the time is retraced, and signals representative of the oldest detected values are outputted from the right-hand ends of the shift registers 46 and 47. If the paths do not merge, the switch 56 selects the surer of the detected value outputs from the registers 46 and 47 in accordance with the output of the subtracter 44. In this way, the Viterbi detection corrects past errors by selecting the surer path.

The Viterbi detector of FIG. 6 dispenses with an equalization process which generally requires emphasis of high frequency signal components and emphasis of low frequency signal components lowering the signal-to-noise ratio. Accordingly, the Viterbi detector of FIG. 6 allows a high signal-to-noise ratio.

It should be noted that the sampling rate in the Viterbi detector of FIG. 6 may be equal to the bit rate in the transmission line.

In general, the input signal representative of the value $y_k$ which is applied to the Viterbi detector of FIG. 6 is composed of a digital signal which is derived by an analog-to-digital converter from a sample of a reproduced signal. Accordingly, all the signals handled in the Viterbi detector of FIG. 6 are generally digital or binary, and all the elements of the Viterbi detector of FIG. 6 are generally of the digital types. It should be noted that the signals in the Viterbi detector of FIG. 6 may be analog, and that the elements of the Viterbi detector of FIG. 6 may be of the analog types.

Figure 7:
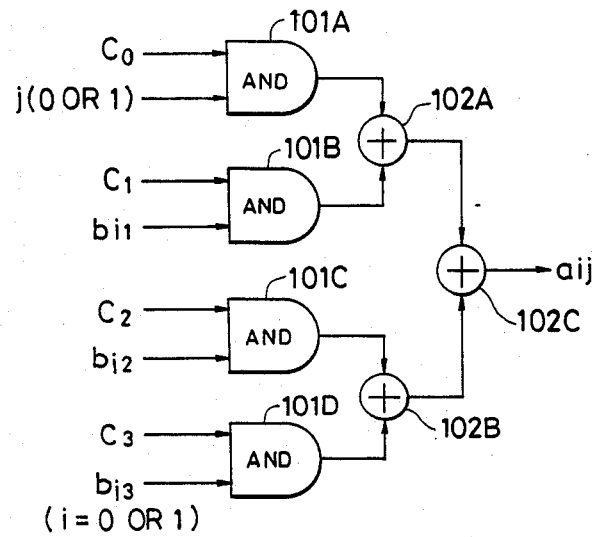
FIG. 7 is a block diagram of the accumulators of FIG. 6.

The accumulators 51–54 have similar internal structures. FIG. 7 shows the internal structure of the accumulators 51–54. As shown in FIG. 7, in the accumulators 51–54, first input terminals of AND gates 101A, 101B, 101C, and 101D receive signals representative of the values $c_0$, $c_1$, $c_2$, and $c_3$ respectively which are outputted from the register 55 (see FIG. 6) as the values $c_m$. A second input terminal of the AND gate 101A receives a signal representative of the value "j" which equals "0" or "1". In the case where the value "j" equals "0", the AND gate 101A is closed so that an output from the AND gate 101A equals "0". In the case where the value "j" equals "1", the AND gate 101A is opened so that the signal representative of the value $c_0$ passes through the AND gate 101A. Second input terminals of the AND gates 101B, 101C, and 101D receive signals representative of the values $b_{i1}$, $b_{i2}$, and $b_{i3}$ respectively which are outputted from the shift register 46 or 47 (see FIG. 6) as the values $b_{im}$. The value "i" equals "0" or "1". The AND gates 101B–101D are closed and opened in accordance with the signals representative of the values $b_{i1}$–$b_{i3}$. When the AND gates 101B–101D are closed, outputs from the AND gates 101B–101D equal "0". When the AND gates 101B–101D are opened, the signals representative of the values $b_{i1}$–$b_{i3}$ pass through the AND gates 101B–101D. The outputs from the AND gates 101A–101D are summed up by adders 102A, 102B, and 102C to generate a signal representative of the assumed amplitude value $a_{ij}$.

Figure 8:
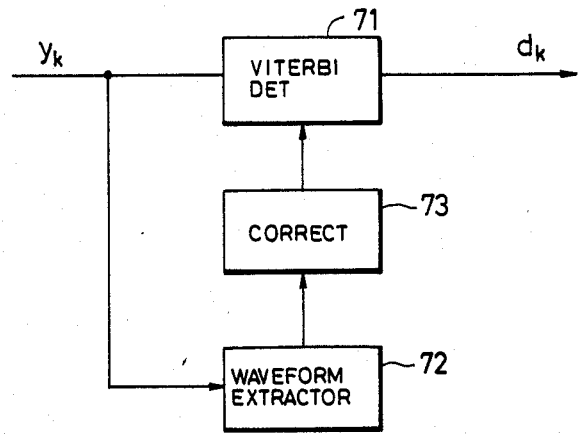
FIG. 8 is a block diagram of an automatic detector according to a second embodiment of this invention.

FIG. 8 shows an automatic detector according to a second embodiment of this invention. The automatic detector of FIG. 8 is applied to a system in which recorded or transmitted codes include particular codes, such as, impulse type codes, corresponding to particular waveforms. At a detector side, an input signal is sampled at a rate equal to the bit rate in the transmission line.

The automatic detector of FIG. 8 includes a device 72 which extracts a response waveform of the particular codes from the input signal representative of the input value $y_k$. An output signal from the waveform extractor 72 which represents the extracted response waveform is applied to a correction circuit 73 connected to a Viterbi detector 71. The Viterbi detector 71 is similar to that of FIG. 6. The device 73 corrects a series of transmission line impulse response values $c_m$ in accordance with the extracted waveform. For example, the correction circuit 73 updates the contents of the register 55 (see FIG. 6) in accordance with the extracted response waveform.

The waveform extractor 72 is preferably composed of registers. The correction circuit 73 is preferably composed of registers, adders, and subtracters.

Figure 9:
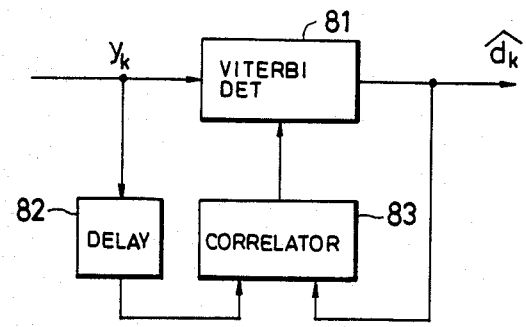
FIG. 9 is a block diagram of an automatic detector according to a third embodiment of this invention.

FIG. 9 shows an automatic detector according to a third embodiment of this invention. The automatic detector of FIG. 9 includes a Viterbi detector 81, a delay circuit 82, and a correlation circuit or correlator 83. The input signal representative of the input value $y_k$ is transmitted to the correlator 83 via the delay circuit 82. The device 82 delays the signal representative of the input value $y_k$ by a time corresponding to a time lag in signal detection by the Viterbi detector 81. It should be noted that the input values $y_k$ are obtained by sampling the input analog signal at a rate equal to a data decoding rate. The detected output $\hat{d}_k$ from the Viterbi detector 81 is regarded as being equal to the transmission line input (recorded codes) $d_k$.

When the codes $\hat{d}_k$ are binary and have no correlation, it is possible that the value "−1" is used in place of the code $\hat{d}_k=0$ and the following ralation is obtained.

$$\hat{d}_k = \begin{cases} 1 \\ \quad \text{(random series)} \\ -1 \end{cases} \tag{8}$$

The correlator 83 calculates mutual correlation coefficients $c_m$ by referring to the following equation.

$$c_m = (1/K) \cdot \sum_{k=1}^{K} \hat{d}_{k-m} y_k \tag{9}$$

where the character K denotes the number of times of averaging processes. The mutual correlation coefficients $c_m$ are equal to the series of the transmission line impulse response values. An output signal from the correlator 83 which represents the mutual correlation coefficients $c_m$ is applied to the Viterbi detector 81. The Viterbi detector 81 converts the input values $y_k$ into corresponding digital values in accordance with the values $c_m$ by regarding the input values $y_k$ as superposition of impulse responses.

Figure 10:
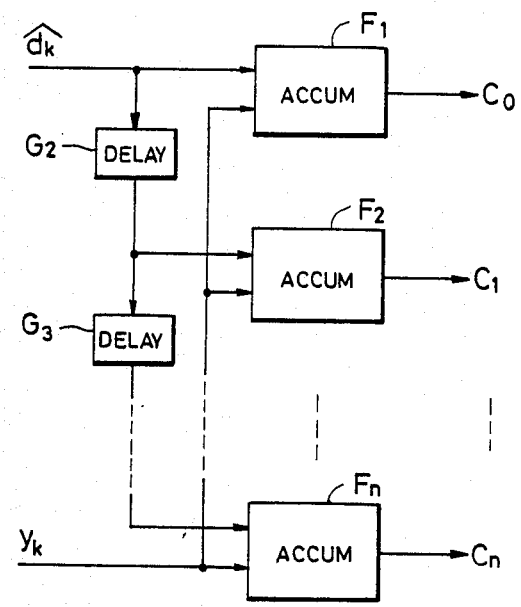
FIG. 10 is a block diagram of the correlation circuit of FIG. 8.

FIG. 10 shows an internal structure of the correlator 83. As shown in FIG. 10, the correlator 83 includes accumulators F1, F2, ..., Fn having first input terminals subjected to the input values $y_k$. Second input terminals of the accumulators F1–Fn are subjected to delayed random series values $\hat{d}_{k-m}$ which are derived from the random series values $\hat{d}_k$ by latches G2–Gn. The accumulators F1–Fn calculate the values $c_m$ in accordance with the equation (9). In the accumulators F1–Fn, addition and subtraction with respect to the values $y_k$ are changed and the results are summed up, since the values $\hat{d}_{k-m}$ are "1" or "−1".

The automatic detectors of FIG. 8 and FIG. 9 can compensate for variations in the characteristics of the transmission line. In cases where different magnetic tape recording systems are used in the transmission line, the automatic detectors of FIG. 8 and FIG. 9 can maintain desired detection characteristics independent of different characteristics of magnetic tapes and magnetic heads.

What is claimed is:

1. A Viterbi detector comprising:
   (a) means for sequentially receiving a series of symbols representing input amplitude values which tend to be affected by amplitude interference between adjacent symbols;
   (b) means for generating a plurality of assumed detection values corresponding to the currently-received input amplitude value;
   (c) means for generating a plurality of Viterbi detection series corresponding to possible survived paths related to the input values;
   (d) means for generating a plurality of assumed detection value series corresponding to combination of the plurality of the viterbi detection series and the plurality of the assumed detection values;
   (e) means for generating a data series corresponding to amplitude interference between the adjacent symbols;
   (f) means for determining assumed input amplitude values in accordance with the assumed detection value series and the data series;
   (g) means for calculating differences between the assumed input amplitude values and the currently-received input amplitude value;
   (h) means for calculating likelihoods on the basis of the calculated differences, the likelihoods corresponding to degrees of sureness of the possible survived paths; (i) means for selecting one of the possible survived paths in accordance with the calculated likelihoods; and
   (j) means for generating a detected value in accordance with the selected survived path.

2. The Viterbi detector of claim 1 wherein the likelihood-calculating means comprises means for squaring the calculated differences, and means for determining the likelihoods in accordance with squares of the calculated differences.

3. The Viterbi detector of claim 1 further comprising means for extracting a predetermined response waveform from a signal inputted via a transmission line, and means for correcting the data series in accordance with the extracted predetermined response waveform.

4. The Viterbi detector of claim 1, further comprising means for determining mutual correlation between the input amplitude values and the detected values, and means for varying the data series in accordance with the determined mutual correlation.

5. A Viterbi detector comprising:
   (a) means for sequentially receiving a series of actual input amplitude values which tend to be affected by amplitude interference between adjacent symbols;
   (b) means for generating a plurality of series of assumed detection values corresponding to a plurality of possible curved paths related to the actual input amplitude values;
   (c) means for generating a series of interference data corresponding to amplitude interference between the adjacent symbols;
   (d) means for determined assumed input amplitude values in accordance with the assumed detection values and with the interference data; and
   (e) means for generating actual detection values in accordance with the actual input amplitude values and with the assumed input amplitude values.

* * * * *